Feb. 14, 1939. H. GEFFCKEN ET AL 2,147,156
PHOTOELECTRIC APPARATUS
Filed Jan. 14, 1935
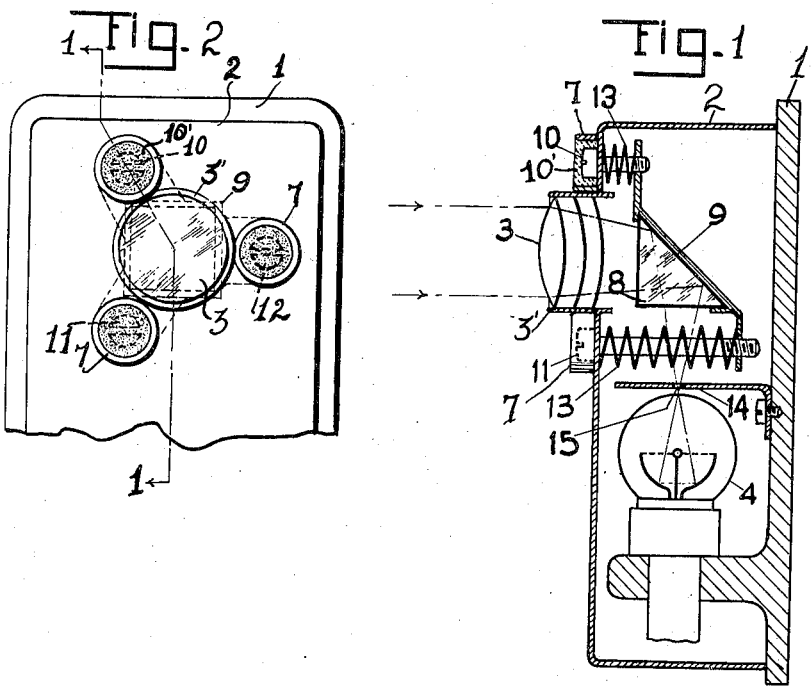
INVENTOR
HEINRICH GEFFCKEN AND
BY    HANS RICHTER
ATTORNEY Patented Feb. 14, 1939

2,147,156

UNITED STATES PATENT OFFICE 2,147,156

PHOTOELECTRIC APPARATUS

Heinrich Geffcken and Hans Richter, Leipzig, Germany, assignors to Radio Patents Corporation, New York, N. Y., a corporation of New York Application January 14, 1935, Serial No. 1,664
In Germany January 13, 1934

4 Claims. (Cl. 250—41.5)

(Granted under the provisions of sec. 14, act of March 2, 1927; 357 O. G. 5)

The present invention relates to photoelectric apparatus, more particularly to arrangements of the type employing a "light bar" and comprising a source for producing a beam of light impinged upon a photoelectric device arranged to operate a suitable translating or indicating device.

As is well known, in the operation of arrangements of the above character the variation of the intensity of the controlling light beam such as may be caused by intervening smoke or other substances intercepting the beam, by varying turbidity or the like of a substance placed in the path of the beam or by a complete interception of the beam by persons or other objects, will cause a response in the photoelectric circuit and in turn actuation of an associated translating or indicating device. In apparatus of this type, usually an optical projector is provided comprising a light source and an optical system or objective for producing a concentrated beam or pencil of light directed upon the photoelectric device. A similar optical lens or objective is arranged close to the photoelectric device for collecting and directing the incident light beam in the direction of maximum sensitivity of the photoelectric device.

In arrangements of the above character it was found that the most favorable and efficient optical conditions are obtained by the use of lenses or objectives having a long focal length. This, however, involves the disadvantage that the apparatus assumes an inconvenient, telescope-like shape so as to project into open spaces such as doorways, etc., and as a result being subject to mechanical injury or exposed to other interference affecting the proper operation of the apparatus.

It is an object of the present invention to provide an improved construction of a photoelectric apparatus completely avoiding the aforementioned disadvantages and enabling the attainment of a compact and rigid structure substantially unaffected by mechanical and other interference during its operation.

Further objects and aspects of the invention will become apparent from the following detailed description taken with reference to the accompanying drawing forming part of this specification and wherein:

Figure 1 is a cross-sectional side view through a photoelectric apparatus constructed in accordance with the invention, and Figure 2 is a fractional front view of the device shown in Figure 1.

The known light operated devices usually comprise a casing having a tubular extension and secured to a wall mounting plate or the like. The tubular extension carries a photographic lens or objective at its front end and the photoelectric device is suitably arranged within the casing in line with the lens axis. The distance between the photoelectric device and the lens is determined by the focal length of the latter and it is seen that a device of this type will project into open spaces such as doorways and for this reason is subject to injury which may result in complete destruction or breakdown of the apparatus or upsetting of the focussing adjustment or alignment of the lens in relation to the photoelectric device.

According to the improved arrangement proposed by the present invention, the casing secured to a base or mounting plate may be given a flat and compact shape substantially free from the above disadvantages. To this end a reflector, such as a mirror or a totally reflecting prism is arranged between the lens and the photoelectric device and serves to deflect the incoming light beam at a right angle to the lens axis so as to point in a direction of maximum sensitivity of the photoelectric device. In this manner, it is possible to avoid an unfavorable and inconvenient shape of the casing while at the same time obtaining the advantage of an increased length of the path of the light beam between the lens and the photoelectric device, thereby enabling the full use of the advantageous properties of lenses of long focal length.

In the practical construction of apparatus of the above type it was found advantageous in certain cases to employ a totally reflecting prism in place of a mirror as a reflecting device by reason of the fact that it is easier to construct a casing in a completely dust-proof manner rather than to render it impermeable to objectionable gases as is necessary when using a mirror as a reflecting element. According to a further advantageous feature of the invention, means are provided for adjusting the reflecting device from the outside of the casing preferably by the aid of a micrometric adjusting arrangement which may be sealed after the adjustment has been completed at the place of installation.

The micrometric adjustment of the mirror or prism is preferably of the type constructed according to the so-called "triple-screw" principle comprising three adjusting screws adjustably mounted in a wall of the casing and holding a support for the reflecting element, said screws being substantially parallel to and equi-distant from the lens axis and displaced by angles of 120° relative to each other.

Referring to the drawing, there is shown a device of the above character comprising a support or wall mounting plate 1 having secured thereto a casing 2 of relatively flat shape with a short tubular extension 3' projecting from its front wall and serving as a mount for an optical lens or objective 3. Item 4 represents a photoelectric tube suitably mounted within the casing upon a bracket integral with or secured to the mounting plate and having its light sensitive surface pointing in an upward direction. There is further provided a plate or support 9 carrying a totally reflecting prism 8 and formed with three extensions substantially equi-distant from the lens axis and displaced by angles of 120° relative to each other, said extensions being threadedly engaged by the inner ends of three screws 10, 11, 12 passing through openings in the front wall of the casing 2. Coil springs 13 are provided surrounding the screw shafts and having their opposite ends engaging the support 9 and the inner wall of the casing 2 to hold the prism in a fixed position. In this manner by adjusting the screws from the outside of the casing, the support 9 and with it the prism 8 may be aligned in such a manner that a controlling light beam entering in the direction of the lens axis is reflected at a right angle so as to point into the direction of maximum sensitivity of the sensitive surface of the photoelectric device 4 as indicated by the dot and dashed lines in the drawing. After the proper adjustment has been made, the device may be sealed by filling cups 7 surrounding the screw heads on the front wall of the casing with a suitable material such as solder as indicated at 10' in the drawing to prevent unauthorized persons from tampering with the apparatus. In order to prevent extraneous light from affecting the photoelectric device and interfering with the proper operation, the lens 3 is so chosen as to have its focal point falling within the space between the prism and the photoelectric device, while a light stop or diaphragm 14 is arranged between the reflecting prism 8 and the photoelectric device 4 having an aperture coinciding with the focal point of the lens.

It will be evident from the above that the invention is not limited to the specific construction and association of parts shown and described for illustration but that numerous embodiments and modifications may be made coming within the broader scope of the invention as defined by the appended claims.

We claim:

1. In photoelectric apparatus for signalling purposes and the like, a casing, a lens mounted in an aperture in the front wall of said casing, a photoelectric device arranged within said casing, the axis of said lens forming a right angle with the direction of maximum sensitivity of said photoelectric device, a reflecting member arranged between said lens and said photoelectric device adapted to deviate a light beam received in the direction of the lens axis so as to point in the said direction of maximum sensitivity of said photoelectric device, a light stop element having an aperture disposed between said reflecting member and said photoelectric device, said aperture coinciding with the focal point of said lens, a support for said reflecting member, and adjusting means for said support actuatable from the outside of said casing.

2. In photoelectric apparatus for signalling purposes and the like, a casing, a lens mounted in an aperture in a wall of said casing, a photoelectric device within said casing, the axis of said lens forming a right angle with the direction of maximum sensitivity of said photoelectric device, an apertured diaphragm disposed between said lens and said photoelectric device adapted to reflect a light beam received in the direction of the lens axis so as to point in the said direction of maximum sensitivity of said photoelectric device, and apertured diaphragm disposed between said reflecting member and said photoelectric device, the aperture of said diaphragm coinciding with the focal point of said lens, a support for said prism, and adjusting means for said support actuatable from the outside of said casing.

3. An arrangement as claimed in claim 1 wherein said adjusting means is comprised of three screws passing through the front wall of said casing and carrying said support, said screws being substantially parallel to and equi-distant from the axis of said lens and displaced from each other by angles of 120°.

4. An arrangement as claimed in claim 1 wherein said adjusting means is comprised of three screws substantially parallel to and equi-distant from the axis of said lens and being displaced from each other by angles of 120°, the outer ends of said screws passing through openings in the front wall of said casing and the inner ends threadedly engaging extensions of said support, and coil springs surrounding said screws with their opposite ends engaging the inner wall of said casing and said support, respectively.

HEINRICH GEFFCKEN.
HANS RICHTER.